Figure 1:
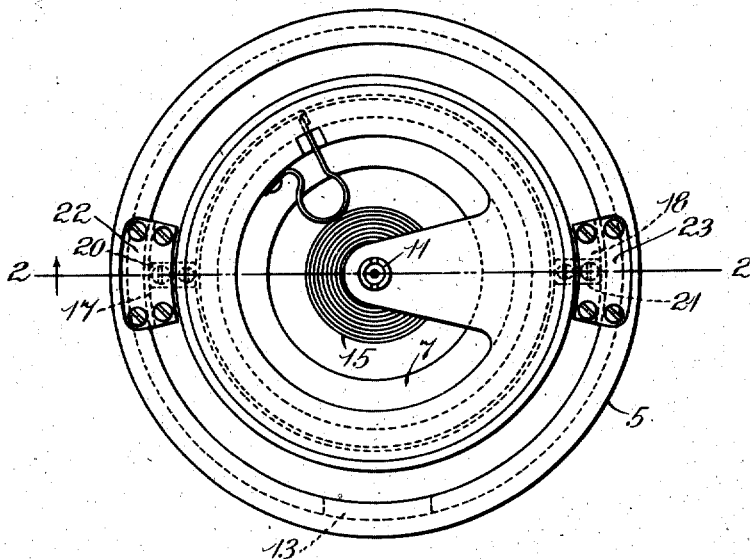

W. K. MENNS.
ELECTROMAGNETIC INSTRUMENT.
APPLICATION FILED OCT. 26, 1910.

1,008,484.

Patented Nov. 14, 1911.
2 SHEETS—SHEET 1.

Witnesses.
Franklin E. Low
Annie J. Dailey

Inventor:
Walter K. Menns,
by his attorney
Charles L. Gording

UNITED STATES PATENT OFFICE.

WALTER K. MENNS, OF MALDEN, MASSACHUSETTS, ASSIGNOR TO CHARLES H. PEARSON, OF BROOKLINE, MASSACHUSETTS.

ELECTROMAGNETIC INSTRUMENT.

1,008,484.     Specification of Letters Patent.     Patented Nov. 14, 1911.

Application filed October 26, 1910. Serial No. 589,190.

*To all whom it may concern:*

Be it known that I, WALTER K. MENNS, a subject of King George V of England, residing at Malden, in the county of Middlesex and State of Massachusetts, have invented new and useful Improvements in Electromagnetic Instruments, of which the following is a specification.

This invention relates to improvements in indicating devices such as electricity meters, tachometers and electro-magnetic speed indicators, and particularly to electro-magnetic indicating devices of that class in which the indicating element is moved by a disk of low electrical resistance placed within the field of a magnetic rotor which, when rotated, sets up lines of magnetic force flowing through the disk producing a braking effect which tends to rotate the disk with the rotor, there being provided a spring restraining the disk and acting to return it to its initial or zero position when the magnetic rotor ceases to rotate. The variable rotation of the magnetic rotor due to the variable speed of the machine to which it is connected to be driven acts to move the indicating element to varying positions corresponding to the speed of the machine, there being provided a suitable graduated scale by means of which the speed may be read. Such instruments have been found to be very seriously affected in their accuracy by variations in temperature as, for example, in the case of magnetic speedometers for automobiles which are usually calibrated at a temperature of about 68 or 70° F., actual tests have shown an inaccuracy in reading amounting to 16⅔% over-registration at 16.3° F. and amounting to 15% under-registration at 137.5° F., the variation per degree change of temperature being .27%. This means a discrepancy of about ten miles per hour between summer and winter readings when actually traveling at sixty miles per hour, and a discrepancy of about five miles per hour when actually traveling at thirty miles per hour. Since the reading of the instrument is proportional to the currents induced in the pivoted disk by the rotating magnet and the currents are inversely proportional to the electrical resistance of the disk, the variations in temperature must seriously affect the speedometer readings.

It is a fact that the magnetism of the rotating magnet decreases as the temperature increases from normal, that is, 70° F., and increases as the temperature decreases below normal, and as the torque on the disk depends upon the square of the magnetic field intensity, the variation in the strength of the magnet means double the variation in the speedometer reading. Heretofore, attempts have been made in various ways to overcome these inaccuracies, but thus far the means employed have been too expensive and delicate to be practical and have been uncertain and inaccurate in their results.

The object of my invention is to provide a simple, inexpensive and reliable means for compensating for changes of temperature by changing the relative location of the rotating magnet and pivoted disk, or the relative location of the magnet and the field member, or the relative location of the magnet, the pivoted disk and the field member.

To these ends, my invention consists in the novel features of construction and in the combination and arrangement of parts set forth in the following specification and particularly pointed out in the claims.

Figure 2:
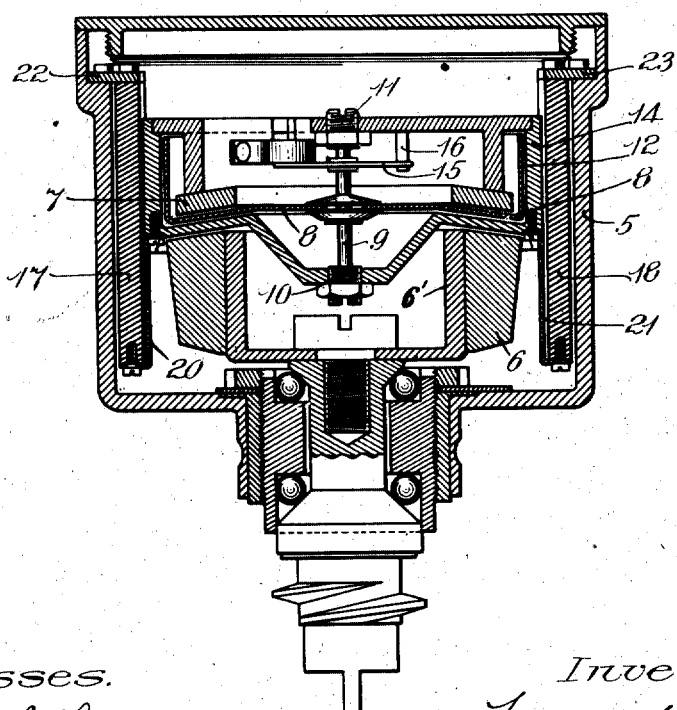
Figure 3:
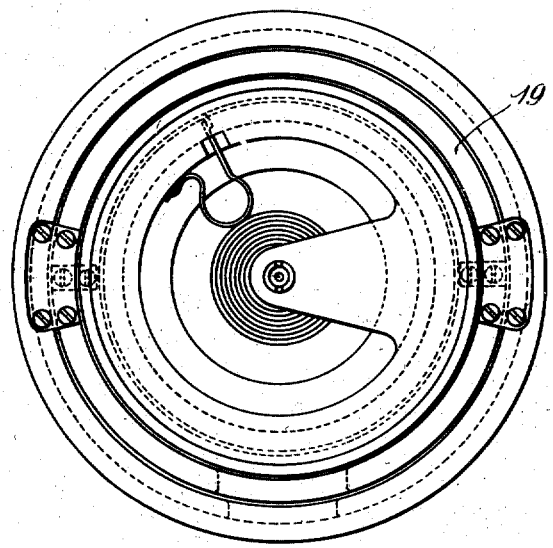
Figure 4:
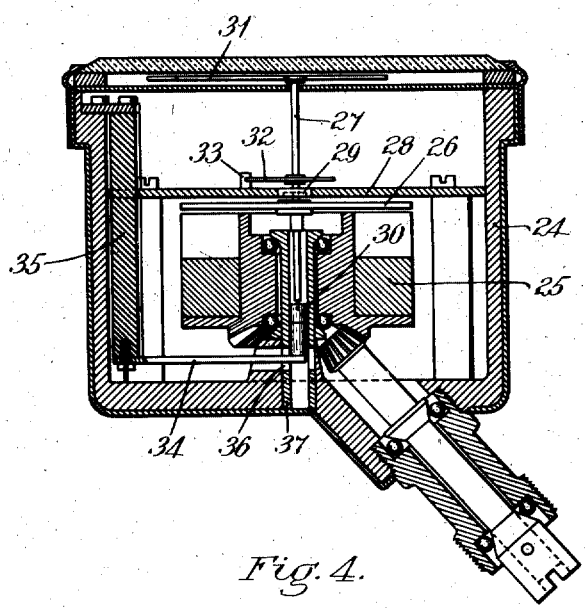

Referring to the drawings: Figure 1 is a plan of an electro-magnetic indicating instrument embodying my invention, the cover being removed. Fig. 2 is a sectional view taken on line 2—2 of Fig. 1. Fig. 3 is a plan of a modification of the instrument shown in Figs. 1 and 2 and differing therefrom in that in the form shown in Figs. 1 and 2, there are a plurality of thermostats, while in Fig. 3, there is a single tubular thermostat surrounding the magnet and indicating parts. Fig. 4 is a vertical sectional view of another type of electromagnetic instrument embodying my invention.

Like numerals refer to like parts throughout the several views of the drawings.

In the drawings, referring to Figs. 1, 2 and 3, wherein I have shown an electromagnetic speedometer of the "Warner" type, and referring now more particularly to Figs. 1 and 2, 5 is the outer casing, 6 the magnetic rotor carried by a hollow cup-shaped member 6', 7 the field ring, and 8 is the aluminum disk interposed between the magnetic rotor and the field member and affixed to a shaft 9 pivoted in bearings consisting of screw-threaded rods 10 and 11 so as to swing freely on the same axis on which the rotor 6 rotates. This disk, which carries the indicating element, is provided with a vertical flange 12 which, in practice, is provided with suitable numerals on its periphery, not shown, which numerals are viewed through a window 13 in the casing 5. The bearings 10 and 11 and the field ring 7 are mounted in an inner casing 14 which is of non-ferrous material. When the rotor 6 is rotated, it generates eddy currents in the metal disk 8, the reaction of these currents on the magnetic field of the rotor supplying a torque to the disk, so that the magnetic pull thereon tends to rotate the disk with the rotor. The disk, however, is restrained by suitable means consisting of a hair spring 15 secured at its inner coil to the shaft 9 and at its outer end to a suitable fixed pin 16. This spring acts to keep the indicator steady at all speeds and return it to zero when the magnetic rotor 6 stops. The field ring 7 serves to concentrate and conserve the magnetism, thereby insuring a more powerful pull on the pivoted disk 8. Thus far, the construction and operation are well known to those skilled in the art.

I will now proceed to described the means whereby I am enabled to compensate for changes in temperature, whereby the inaccuracies of the instrument owing to variations of temperature are obviated. The inner casing 14 which contains the field ring 7 and the pivoted disk 8 is supported by one or more thermostats, each of which comprises a body composed of hard rubber which is employed because it has a very high coefficient of expansion. In Fig. 2, I have shown two of these hard rubber thermostats 17 and 18 which may be segmental in form, and in Fig. 3, I have shown a single thermostat 19 which is annular in form and surrounds the magnetic rotor and the indicating parts.

The thermostats 17 and 18 constitute supporting posts for the inner casing 14 to which they are connected by suitable means such, for example, as brackets 20 and 21 secured to the lower extremities of said posts, respectively, while the upper extremities of said posts are supported, respectively, by plates 22 and 23 secured to the outer casing 5. The length of these posts is such that at a normal temperature, say 70° F., at which the instrument is graduated, the air gap between the magnetic rotor 6 and the aluminum disk 8 is such that the reading of the instrument is correct for all speeds and when the temperature varies above and below normal, the thermostats 17 and 18 expand and contract vertically, thus raising and lowering the casing 14 together with the ring 7 and disk 8, it being understood that when the temperature goes below normal the casing is raised and when the temperature goes above normal the casing is lowered.

Since the magnetism of the rotating magnet decreases as the temperature increases, and increases as the temperature decreases, it will be seen that by making the thermostats 17 and 18 the proper length these changes of temperature can be compensated for by imparting to the disk 8 or the ring 7 or both a motion relative to the rotating magnet 6, thus varying the gap between the rotating magnet and the disk 8 and ring 7. Consequently, although the field of the rotating magnet varies in intensity according to changes of temperature, the torque upon the pivoted disk 8 is made uniform by the employment of these thermostats and the readings of the instrument are made substantially correct for all speeds.

Referring now to Fig. 4, wherein I have shown what is well known to those skilled in the art as the "Stewart" type of electromagnetic speedometer, 24 is the casing in which is journaled the magnetic rotor 25 and placed above this rotor is a metallic disk 26 of low electrical resistance mounted upon a shaft 27. Above this disk is located a field disk 28 which serves to concentrate and conserve the magnetism of the magnetic rotor, thus insuring a very powerful pull on the pivoted disk 26. The shaft 27 is journaled in a bearing 29 in which it is capable of sliding freely vertically and is journaled at its lower end in a pivot bearing 30. The upper end of the shaft carries an indicator hand 31. A hair spring 32 which is affixed at its inner coil to the shaft 27 and at its outer end to a fixed pin 33 tends to resist the rotation of the disk 27 under the influence of the magnetic rotor 25 and acts to return the hand 31 to zero position when the rotation of the rotor ceases. In this type of instrument, as in the type first described, the accuracy of the instrument is greatly impaired by variations in temperature which causes a weakening of the magnetic force of the rotor as the temperature increases and a strengthening of the magnetic force as the temperature decreases. To compensate for these changes, I have supported the lower pivot bearing 30 of the shaft 27 upon the free end of an arm 34, said arm being rigidly supported at its other end upon a hard rubber post 35 constituting a thermostat, the upper end of this post being suitably secured to the casing 24. The inner end of the arm 34 projects through an aperture 36 provided in a hollow shaft 37 constituting a support for the bearings of the magnetic rotor 25 and constituting also a guide for the vertically movable pivot bearing 30. When the temperature rises above normal, the hard rubber post 35 will expand, thus causing the pivot bearing 30 to be lowered and carrying the disk 36 nearer to the magnetic rotor 25. On the other hand, when the temperature falls below normal, the thermostat 35 contracts, thus lifting the pivot bearing 30 and carrying the disk 36 to a greater distance from the magnetic rotor 25. In this way, the varying intensity of the magnetic field due to the variations in temperature is compensated for by moving the disk in the proper direction so that the torque upon said disk is maintained uniform regardless of changes of temperature and as a result the readings of the instrument are substantially correct for all speeds and all temperatures.

It will be understood that both in the specification and in the claims where I have referred to hard rubber thermostats, this term means a thermostat composed of a sufficient quantity of hard rubber to give the necessary expansive movement to compensate for changes of temperature.

Having thus described my invention, what I claim and desire by Letters Patent to secure is:

1. An electro-magnetic instrument having, in combination, means for producing a magnetic field, a metal disk rotatably mounted in said field, and a thermostat for changing the relative location of said disk and said field to compensate for changes of temperature, said thermostat consisting of a body containing hard rubber.

2. An electro-magnetic instrument having, in combination, means for producing a magnetic field, a metal disk rotatably mounted in said field, and a thermostat for changing the relative location of said disk and said field to compensate for changes of temperature, said thermostat consisting of a body composed of hard rubber.

3. An electro-magnetic instrument having, in combination, a field member and a coöperating rotatable magnet for producing a magnetic field, a metal disk rotatably mounted in said field, and means including a hard rubber thermostat forming an operative connection between said magnet and said disk for changing the relative location of said disk and said field to compensate for changes of temperature.

4. An electro-magnetic instrument having, in combination, a field member and a coöperating rotatable magnet for producing a magnetic field, a metal disk rotatably mounted in said field, and means including a hard rubber thermostat forming an operative connection between said field member and said magnet for changing the relative location of said field member and said magnet to compensate for changes of temperature.

5. An electro-magnetic instrument having, in combination, a field member and a coöperating rotatable magnet for producing a magnetic field, a metal disk rotatably mounted in said field, and means including a hard rubber thermostat forming an operative connection between said magnet and said field member and disk, for changing the relative location of said field member and disk to said magnet to compensate for changes of temperature.

6. An electro-magnetic instrument having, in combination, means including a rotatable magnet for producing a magnetic field, a metal disk rotatably mounted in said field, and means including a hard rubber thermostat extending longitudinally of the axis of said magnet and disk and forming an operative connection between said magnet and said disk for changing the relative location of said disk and said field to compensate for changes of temperature.

7. An electro-magnetic instrument having, in combination, a casing, a field member and a coöperating rotatable magnet located in said casing for producing a magnetic field, a metal disk rotatably mounted in said field, a hard rubber thermostat for changing the relative location of said disk and magnet to compensate for changes of temperature, said thermostat being secured at one end to said casing, and means connecting the other end of said thermostat to said disk.

8. An electro-magnetic instrument having, in combination, an outer casing, a magnet rotatably mounted in said casing for producing a magnetic field, an inner casing located within said outer casing, a metal disk rotatably mounted in said inner casing in said field, and a hard rubber thermostat secured at one end to said outer casing and having its other end connected to said inner casing for changing the relative location of said disk and magnet to compensate for changes of temperature.

9. An electro-magnetic instrument having, in combination, means for creating a rotating magnetic field, a member arranged within the influence of said field to be rotated thereby, means for yieldingly opposing said rotation, and means for supporting said member including a hard rubber thermostatic device, whereby the relation of said member with respect to the rotating field is varied according to variations in atmospheric temperature, to vary the lines of force effective to rotate said member.

10. An electro-magnetic instrument having, in combination, means for creating a rotating magnetic field, a member arranged within the influence of said field to be rotated thereby, means for yieldingly opposing said rotation, and a hard rubber member operated by variations in atmospheric temperature for moving said first-named member in said field to vary the number of lines of force of said field cut by said member.

11. An electro-magnetic instrument having, in combination, means for creating a rotating magnetic field, a member arranged within the influence of said field to be rotated thereby, a spindle on which said member is supported, means connected to said spindle for yieldingly opposing said rotation, and means for supporting said spindle including a hard rubber thermostatic device whereby the relation of said member with reference to the rotating field is varied according to variations in atmospheric temperature, to vary the number of lines of force of the rotating field cut by said member.

12. An electro-magnetic instrument having, in combination, a magnet and a magnetic mass, a member arranged to extend into the space between said mass and said magnet, means for causing relative movement of the magnet and magnetic mass to create a rotating magnetic field in said space, and means to form a support for said member including a hard rubber member.

13. An electro-magnetic instrument having, in combination, a magnet and a magnetic mass, a hollow rotatable support carrying one of these parts, a rod longitudinally movable within said support, means for supporting said rod including a hard rubber thermostatic device, and a member carried by said rod, said member being interposed between said mass and said magnet.

14. An electro-magnetic instrument having, in combination, a magnet and a magnetic mass, a hollow rotatable support for one of these parts, a rod longitudinally movable within said support, a member interposed between said magnet and said mass, a spindle upon which said member is mounted, said spindle being supported on said rod, and means for supporting said rod including a hard rubber thermostatic device.

In testimony whereof I have hereunto set my hand in presence of two subscribing witnesses.

WALTER K. MENNS.

Witnesses:
  LOUIS A. JONES,
  WALTER E. MCGRAW.